United States Patent [19]

Matsuda et al.

[11] Patent Number: 4,596,994

[45] Date of Patent: Jun. 24, 1986

[54] LIQUID JET RECORDING HEAD

[75] Inventors: Hiroto Matsuda, Ebina; Masami Ikeda, Machida; Makoto Shibata; Hiroto Takahashi, both of Hiratsuka, all of Japan

[73] Assignee: Canon Kabushiki Kaisha, Tokyo, Japan

[21] Appl. No.: 603,723

[22] Filed: Apr. 25, 1984

[30] Foreign Application Priority Data

Apr. 30, 1983 [JP] Japan .................................. 58-76499

[51] Int. Cl.[4] .............................................. G01D 15/18

[52] U.S. Cl. ................................................ 346/140 R

[58] Field of Search .................................... 346/140 R

[56] References Cited

U.S. PATENT DOCUMENTS 4,335,389 6/1982 Shirato et al. .................. 346/140 R 4,392,907 7/1983 Shirato et al. ....................... 156/252

4,450,457 5/1984 Miyachi et al. ................. 346/140 R

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A liquid jet recording head comprises, in combination, a liquid discharge section having an orifice for forming flying liquid droplets at the time of the liquid discharge and a liquid flow path which is communicatively connected with the orifice and has as its one part a heat acting zone where heat energy acts on the liquid to form the liquid droplets; an electro-thermal transducer having at least a pair of electrodes arranged in mutual confrontation and in electrical connection with a resistive heat generating layer on a substrate to form a heat generating portion between said pair of electrodes; and a protective coating made up of three or more layers, each comprising an inorganic material, and laminated in a manner to cover the top surface of at least the heat generating portion, the inorganic materials constituting two mutually adjacent layers in the protective coating including therein at least one constituent element common to both layers.

11 Claims, 3 Drawing Figures

LIQUID JET RECORDING HEAD

BACKGROUND OF THE INVENTION

1. Field of the Invention

This invention relates to a liquid jet recording head, and, more particularly, it is concerned with a liquid jet recording head which functions to form and eject flying liquid droplets of recording liquid for use in a liquid jet recording system.

2. Description of the Prior Art

The ink jet recording method (or liquid jet recording method) has drawn the attention of all concerned in its capability of high speed recording, with neglible noise, and in its capability of performing recording without necessitating special treatment, such as the so-called "image fixing" on plain paper.

Of various liquid jet recording methods, those as disclosed in, for example, Japanese laid-open patent application 54-51837 and German laid-open patent application (DOLS) 2843064 are peculiar in their characteristics and are different from other liquid jet recording methods in that thermal energy is caused to act on the recording liquid to obtain motive power for ejecting liquid droplets.

That is to say, the recording methods disclosed in the publications above referred to have their characteristics in that the recording liquid which has undergone action of the thermal energy brings about a change of state accompanying an abrupt increase in its volume, and this change of state creates an acting force to eject the liquid from the orifice at the distal end of the recording head, thereby forming flying droplets to be adhered onto a recording member for image recording.

In particular, the liquid jet recording method disclosed in DOLS 2843064 possesses its characteristics such that not only it is effectively applicable to the so-called "drop-on-demand" recording method, but also a full line type high density, multi-orifice recording head can be readily realized in the recording apparatus, hence an image of high resolution and high quality can be obtained at a high recording speed.

The recording head unit of the recording apparatus for use in the abovementioned liquid jet recording method is constructed with a liquid discharge section having an orifice for ejecting the recording liquid and a liquid flow path which is communicatively connected with the orifice, and has as its part a heat acting zone where thermal energy acts on the liquid for droplet discharge; and electro-thermal transducer as a thermal energy generating means.

This electro-thermal transducer is provided with a pair of electrodes and a resistive heat generating layer which is connected with the electrodes and has a region to generate heat between these electrodes (heat generating portion). The pair of electrodes is generally composed of a selective electrode and a common electrode, across which electric conduction is effected to generate thermal energy in the abovementioned heat generating portion for ejecting liquid droplets from the orifice.

In the ordinary case, a protective coating (or layer) is provided on the heat generating portion and at least on the electrode disposed underneath the region in the recording head where the recording liquid flows or stays. The protective coating is provided for protecting the electrodes and the resistive heat generating layer forming the heat generating portion both chemically and physically from the liquid thereabove, for preventing short-circuiting between the abovementioned pair of electrodes and leakage of electric current from the same type of electrodes, particularly, the current leakage across the selective electrodes, and for preventing electric corrosion of the electrodes which can take place by contact of the liquid and the electrode and by electric conduction thereacross.

The abovementioned protective coating is required to have various characteristics depending on the place where it is provided. For example, when it is provided on the heat generating portion, the protective coating is required to have (1) heat-resistant properties, (2) liquid-resistant properties, (3) liquid penetration preventive properties, (4) heat-conductivity, (5) oxidation preventive properties, (6) insulating properties, and (7) anti-cracking properties; and, when it is provided on other region than the heat generating portion, the protective coating is required to be excellent in its liquid penetration preventive, liquid-resistant, insulating, and anti-cracking properties, although these properties may be relaxed to some extent depending on the thermal conditions.

However, at the present, there is no material available for forming the protective coating which can satisfy all the abovementioned seven requirements with a single layer and yet cover the entire region on the heat generating portion and the electrodes. In the actual recording head, therefore, various materials having mutually complementary properties for the required characteristics are selected depending on the location where the protective coating is to be provided, and these materials are laminated in a plurality of layers for the protective coating. Such multi-layered protective coating is further required to have sufficiently high adhesive strength among the laminated layers, and not to bring about troubles due to decrease in the adhesive strength such as exfoliation and floating between the adjacent layers in the course of production of the recording head or during a period of its actual use.

Apart from the above, in the case of the multi-orifice type liquid jet recording head, since a multitude of very fine electro-thermal transducers are simultaneously formed on the substrate in the course of manufacturing the recording apparatus, there are repeatedly performed formation of each and every layer on the substrate or base member, and removal of a part of the layers thus formed, and, at the stage of forming the protective coating, the surface of the laminated layers on which the protective coating is to be formed has very fine surface irregularities with wedge portions (stepped portion), so that the step-coverage properties of the protective coating at this stepped portion is of importance. That is to say, if the step-coverage properties of the protective coating at this stepped portion is poor, there occurs penetration of the liquid at this portion to induce electric corrosion or dielectric breakdown. Further, when the protective coating has a sufficiently significant probability of containing defective portions therein owing to its manufacturing method, there inevitably takes place penetration of the liquid through such defective portions with the consequence that the service life of the electro-thermal transducer becomes considerably curtailed.

For the abovementioned reasons, the protective coating is further, required to have good step-coverage properties at the stepped portions, have very low probability of containing defective portions such as pin holes, etc. in the layers to be formed, or, if contained, to such an extent that they are practically negligible.

In particular, the heat acting surface undergoes very severe conditions such that vigorous temperature changing cycles are repeated between high and low temperatures in a frequency of several thousands times per second, and, at the same time, the liquid on the heat acting zone is subjected to repetitive pressure changes such that is is vaporized at the high temperature level to cause bubbling in the liquid, thereby increasing pressure in the liquid flow path, and, the vaporized liquid is condensed and the foams are extinguished with temperature decrease to lower the pressure in the liquid flow path, so that mechanical stress is constantly imparted to the heat acting zone by such repetitive pressure changes. On account of this, the protective coating to be provided for covering the top surface of at least the heat generating portion is required to be particularly excellent in its impact resistant property to the mechanical stress and adhesive property among the plurality of layers constituting the protective coating.

However, the conventional liquid jet recording heads have not been able to satisfy the abovementioned various conditions and requirements. In particular, exfoliation of the layers in the multi-layered protective coating provided on the top surface of the heat generating portion could not be prevented during use of the conventional apparatus over a long period of time, and a peeling-off phenomenon took place very often. Furthermore, the adhesive strength between the adjacent layers of the multi-layered protective coating decreases and exfoliation tended to occur easily between such adjacent layers during every process step of manufacturing the recording head such as, for example, in the step of forming the liquid flow path on the substrate with the electro-thermal transducer protected by the protective coating being provided thereon, or, in the step of severing the recording head for separating the recording head or forming the orifice, or others. It has also taken place often that balance in thickness of each and every layer for the protective coating thus formed is lost due to preference having been given on designing the protective coating so as to fully satisfy the abovementioned requirements for the characteristics of the protective coating, or very delicate variations in the conditions for laminating the layers to construct the protective coating, or other factors.

SUMMARY OF THE INVENTION

The present invention has been made in view of various points of problem as mentioned in the foregoing, and it is a primary object of the present invention to provide a liquid jet recording head which is excellent in its durability against frequent repetitive use or continued use over a long period of time, and is able to maintain stably its initial favorable droplet forming characteristic over a long period of time.

It is another object of the present invention to provide a liquid jet recording head having high reliability in its production.

It is still another object of the present invention to provide a liquid jet recording head of high manufacturing yield, even when it is made a multi-orifice type.

According to the present invention, in general aspect of it, there is provided a liquid jet recording head comprising in combination: a liquid discharge section having an orifice for forming flying liquid droplets at the time of the liquid discharge, and a liquid flow path which is communicatively connected with said orifice and has as its one part a heat acting zone where heat energy acts on the liquid to form the liquid droplets; an electro-thermal transducer having at least a pair of electrodes arranged in mutual confrontation and in electrical connection with a resistive heat generating layer on a substrate to form a heat generating portion between said pair of electrode; and a protective coating made up of three or more layers, each comprising an inorganic material, and laminated in a manner to cover the top surface of at least said heat generating portion, the inorganic materials constituting the mutually adjacent two layers in said protective coating including therein at least one constituent element common to said both layers.

DETAILED DESCRIPTION OF PREFERRED EMBODIMENT

In the following, the present invention will be explained in detail in reference to the accompanying drawing.

Figure 1:
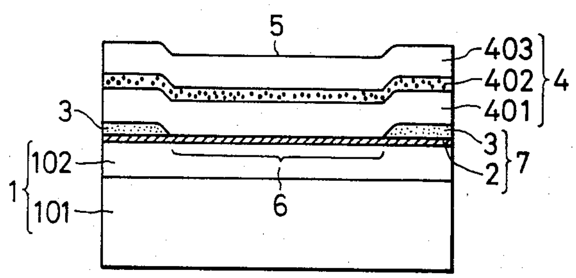
FIG. 1 is a cross-sectional view showing the liquid jet recording head according to the present invention, when the neighborhood of the heat generating portion provided on the substrate is cut along a plane perpendicular to the surface of the resistive heat generating layer.

FIG. 1 is a schematic cross-sectional view showing the neighborhood of the heat generating section of the liquid jet recording head according to the present invention.

In FIG. 1, the substrate or base member 1 comprises a support 101 to be formed of silicon, glass, ceramics, etc., and an under-layer 102 made of $SiO_2$, etc. and placed on the support 101.

The under-layer 102 is mainly provided as the layer for regulating flow of heat generated from the heat generating portion 6 to the side of the support 101. Selection of the constituent material for the layer and the layer thickness are designed so that, when thermal energy is caused to act on the liquid at the heat acting surface 5, more amount of heat may flow from the heat generating portion 6 toward the heat acting surface 5, and, when electric conduction to the electro-thermal transducer 7 is interrupted, the heat remaining in the heat generating portion 6 may quickly flow toward the support 101. For the material constituting the under-layer 102, there may be enumerated, besides the abovementioned silicon dioxide ($SiO_2$), inorganic materials represented by metal oxides such as zirconium oxide, tantalum oxide, magnesium oxide, aluminum oxide, and so forth.

On the top surface of the substrate 1, there is laminated the resistive heat generating layer 2, over which the electrode layer 3 is further laminated. These resistive heat generating layer 2 and the electrode layer 3 are selectively removed from the surface of the substrate 1 by the photo-etching method, etc., leaving thereon desired shapes of these layers. At the heat generating portion 6, the electrode layer 3 is subjected to pattern formation by its being removed from the resistive heat generating layer 2 so that its end parts at both sides may oppose each other with a predetermined distance. This portion of the resistive heat generating layer 2, from which the electrode layer 3 has been removed, constitutes a region which generates heat by electrical conduction through the electrode layer 3 (heat generating portion 6).

Most of the materials may be used as the material for constituting the resistive heat generating layer 2, if they generate heat as desired by the electric conduction.

For such material, metal borides may be exemplified as particularly excellent. Of these metal borides, the most excellent in the characteristics is hafnium boride, followed by zirconium boride, lanthanum boride, vanadium boride, and niobium boride, in the order as mentioned.

Thickness of the resistive heat generating layer is determined by an area of and material used for the resistive heat generating layer, a shape and size of the heat acting zone, and further power consumption in actual use of the recording head, and so on, so that heat generating quantity per unit time may be as desired, although a preferable range is from 0.001 to 5 μm, or more preferably from 0.01 to 1 μm.

For the material constituting the electrode layer 3, there may be effectively used various electrode materials which have been used ordinarily. Concrete examples of such materials are aluminum, silver, gold, platinum, copper, and like other metals.

On the surface of the substrate 1 where the resistive heat generating layer 2 and the electrode 3 have been formed, there is further laminated a protective coating (or layer) 4 as the top layer. This protective coating 4, according to the one as shown in FIG. 1, is of a three-layered structure comprising the first layer 401, the second layer 402, and the third layer 403.

The materials for the layers constituting the protective coating 4 are selected so that the protective coating 4 may have various requisite characteristics as mentioned in the foregoing as the protective coating to be provided on the heat generating portion 6 and may be excellent in the adhesiveness with the substrate, and further the adhesiveness among the layers constituting the protective coating 4 may be also excellent.

The first layer 401 to be provided at the bottom of the protective coating 4 is for chiefly maintaining insulation between the pair of mutually opposed electrodes 3 provided on the resistive heat generating layer 2. For the material constituting the first layer, there may be used an inorganic insulating material such as, for example, inorganic oxides like $SiO_2$, etc., inorganic nitrides like $Si_3N_4$, etc., and others, which is excellent in the insulating property, is relatively excellent in the heat conductivity and heat resistant property, and has adhesive property with the substrate 1.

For the material constituting the first layer 401, there may be exemplified, besides the abovementioned inorganic materials, the following various materials: transition metal oxides such as vanadium oxide, niobium oxide, molybdenum oxide, tantalum oxide, tungsten oxide, chromium oxide, zirconium oxide, hafnium oxide, lanthanum oxide, yttrium oxide, manganese oxide, and others; metal oxides such as aluminum oxide, calcium oxide, strontium oxide, barium oxide, silicon oxide, etc., and composites of these oxides; highly resistive nitrides such as silicon nitride, aluminum nitride, boron nitride, tantalum nitride, etc.; composites of these nitrides; or composites of the nitrides and oxides; semiconductors such as amorphous silicon, amorphous selenium, and others, which are of low resistance in bulk form, but can be rendered to have high electrical resistance in the course of their being formed into a thin film by the sputtering method, CVD method, deposition method, vapor-phase reaction method, liquid coating method, and others. The film thickness of the first layer 401 may preferably range from 0.1 to 5 μm, or more preferably from 0.2 to 3 μm, or most preferably from 0.5 to 3 μm.

The third layer 403 to be provided on top of the protective coating 4 defines the heat acting zone 5 at a position corresponding to the heat generating portion 6 of the liquid jet recording head and to be in direct contact with the recording liquid in the liquid flow path to be provided over the heat generating portion 6. The principal role of this third layer 403 is to impart to the protective coating 4 reinforcement in its liquid penetration preventive property, liquid resistant property, and mechanical strength.

The materials to constitute the third layer 403 should have tenacity, be relatively excellent in its mechanical strength, and be excellent in its heat conductivity, liquid resistant property, and liquid penetration preventive property. Examples of such material are: various metals belonging to the Group IIIa elements in the Periodic Table such as scandium (Sc), yttrium (Y), etc., the Group IVa elements such as titanium (Ti), zirconium (Zr), hafnium (Hf), etc., the Group Va elements such as tantalum (Ta), vanadium (V), niobium (Nb), etc., the Group VIa elements such as chromium (Cr), molybdenum (Mo), tungsten (W), etc., the Group VIII elements such as iron (Fe), cobalt (Co), nickel(Ni), etc., and others; alloys of the abovementioned various metals such as Ti-Ni, Ta-W, Ta-Mo-Ni, Ni-Cr, Fe-Co, Ti-W, Fe-Ti, Fe-Ni, Fe-Cr, Fe-Ni-Cr, and so forth; borides of the above-listed various metals such as Ti-B, Ta-B, Hf-B, W-B, and so forth; carbides of the above-listed various metals such as Ti-C, Zr-C, V-C, Ta-C, Mo-C, Ni-C, and so forth; silicates of the above-listed various metals such as Mo-Si, W-Si, Ta-Si, and so on; and nitrides of the above-listed various metals such as Ti-N, Nb-N, Ta-N, and so on. The third layer 403 can be formed by the deposition method, sputtering method, CVD method, and so on using the above-listed materials. Thickness of the layer may preferably range from 0.01 to 5 μm, or more preferably from 0.1 to 5 μm, or most preferably from 0.2 to 3 μm. It should be noted that, in selecting the material and the thickness for the layer, the layer may preferably be higher in its resistivity than the ink, the resistive heat generating layer, and the electrode layer. For instance, it is preferable to make the layer having the resistivity of 1 ohm.cm or below. Those insulative materials such as Si-C, etc. having high mechanical impact strength can be suitably used.

By provision of the third layer 403 constructed with the above-listed material at the top surface of the protective coating 4, it becomes possible to sufficiently absorb the shock from the cavitation action to occur at the time of the liquid ejection at the heat acting zone 5, whereby the operating life of the heat generating portion 6 can be effectively prolonged at a great stride.

Further, between the first layer 401 of the protective coating 4 and the third layer 403 thereof, the second layer 402 is provided. This second layer 402 constitutes the characteristic feature of the liquid jet recording head according to the present invention. In the conventional liquid jet recording head, the protective coating provided on the heat generating portion is basically of a double layer structure which is equivalent to the first layer 401 and the third layer 403 of the present invention. The protective coating of such construction is not always satisfactory in its adhesive strength between the mutually laminated layers, which causes exfoliation or floating of the adjacent layers to impair reliability and durability of the liquid jet recording head.

Therefore, the principal role of the second layer 402 as one of the elements constituting the protective coating 4 and provided for eliminating the above-described disadvantages is to strengthen the adhesiveness between the first layer 401 and the third layer 403.

As the material for constituting the second layer 402, there may be used various materials which are capable of increasing adhesiveness with the first layer 401 and the third layer 403, and which do not impair the characteristics required of the protective coating by its mounting on the heat generating portion. The optimum material for this second layer 402 should contain therein at least one first element common to the constituent element of the material for the first layer 401 and at least one second element common to the constituent element of the material for the third layer 403. The abovementioned first and second elements are not necessarily different each other, but both may be identical.

Preferred examples of the material constituting the second layer 402 are as follows: (1) in case the first layer 401 is an oxide and the third layer 403 is a metal, the material constituting the second layer 402 is an oxide of the metal constituting the third layer 403; (2) in case the first layer 401 is a nitride or a carbide and the third layer is a metal, the material constituting the second layer 402 is a nitride or a carbide of the metal constituting the third layer 403. Further, as a preferred example of the material constituting the second layer 402 in combination with the first layer 401 and the third layer 403, there may be exemplified use of silicon oxide for the first layer 401, tantalum for the third layer 403, and tantalum oxide for the second layer 402. In the same way, there may further be exemplified the following combinations: aluminum oxide for the first layer, zirconium for the third layer, and zirconium oxide for the second layer, tantalum oxide for the first layer, hafnium for the third layer, and hafnium oxide for the second layer; silicon nitride for the first layer, tantalum for the third layer, and tantalum nitride for the second layer; aluminum nitride for the first layer, molybdenum for the third layer, and molybdenum nitride for the second layer, and other combinations.

By the provision of the second layer 402 as mentioned in the preceding, the adhesive strength of the protective coating 4 as a whole is remarkably increased. In the foregoing explanations of the liquid jet recording head according to the present invention, the protective coating on the heat generating portion has been dealt with in particular. It should, however, be noted that the present invention is not, of course, limited to such protective coating alone, but the combination of the invention as described above can be applied to the protective coating of a multi-layer structure to be provided on the substrate at its other location than the heat generating portion, e.g., on top of the electrodes. Furthermore, the protective layer of the present invention, as has been explained in the foregoing, is of a multi-layered structure composed of three layers, but the combination of the material according to the present invention is also applicable to any multi-layered structure composed of more than three layers.

The liquid jet recording head according to the present invention is completed by further forming the liquid flow path and the orifice in correspondence to the heat generating portion defined on the substrate by the electro-thermal transducer protected by the protective coating 4 as shown in FIG. 1.

Figure 2:
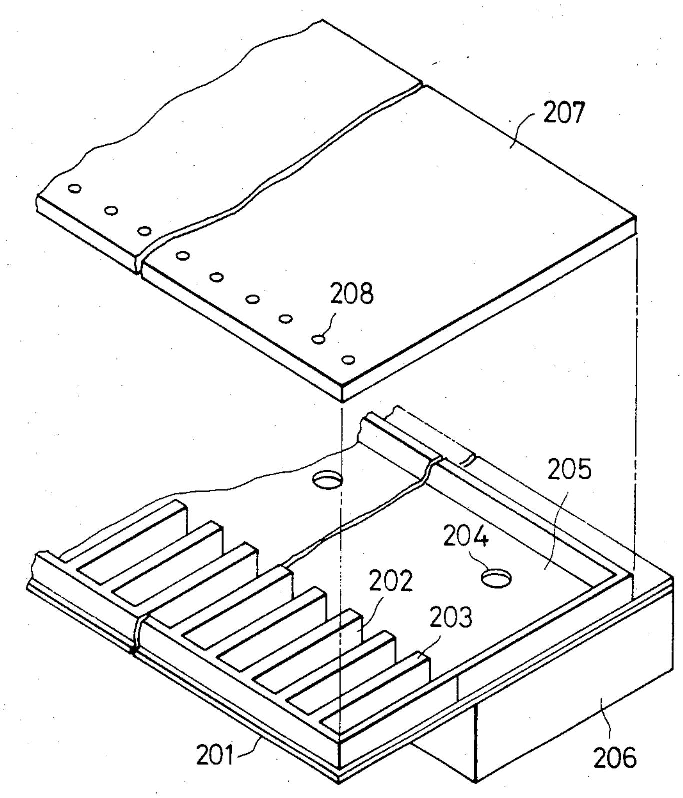
FIG. 2 is a partial, schematic, exploded perspective view showing one embodiment of the liquid jet recording head according to the present invention.

FIG. 2 is a schematic, exploded, perspective view showing one embodiment of the complete liquid jet recording head according to the present invention.

This recording head is completed by first laminating a photosensitive resin dry film on the substrate 201, then providing the flow path wall 203 and the common liquid chamber 205 in correspondence to the heat generating portion on the substrate by means of exposure and development through a predetermined pattern masking, and finally laminating and adhering on the flow path wall the ceiling plate 207 made of a glass plate, plastic plate, etc., and having orifices 208 therein by use of adhesive agent such as epoxy type adhesive. In this recording head, the orifices are formed in the ceiling portion of the liquid flow path 202 in confrontation to the heat acting zone provided at the flow path.

Figure 3:
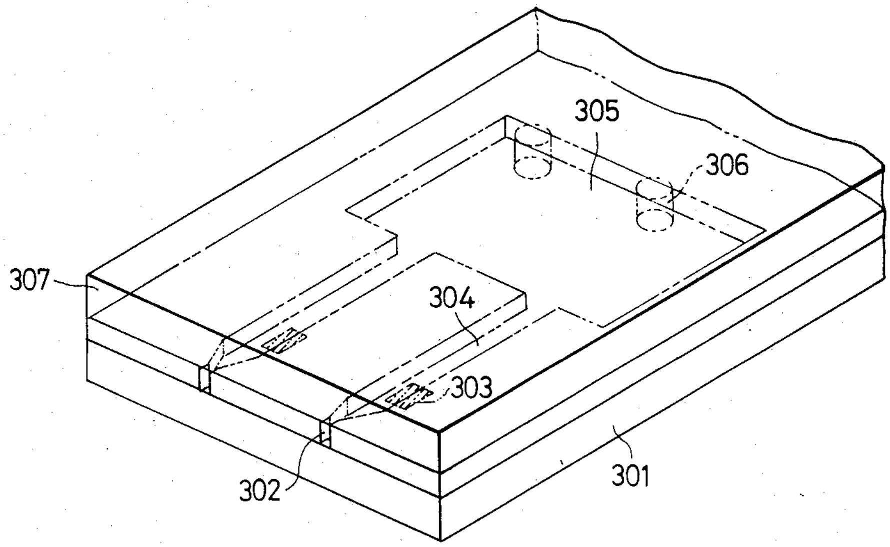
FIG. 3 is a schematic perspective view showing one embodiment of the liquid jet recording head according to the present invention.

FIG. 3 shows a perspective view of the liquid jet recording head according to another embodiment of the present invention which has been fabricated in the same manner as mentioned above. In this recording head, the orifices 302 are formed in and along the direction of the liquid flow path 304, and the ink fed from the ink feeding port 306 and stored in the common liquid chamber 305 is ejected from the orifices 302 by energy of heat generated from the heat generating portion 303, and adheres on the surface of the recording sheet for recording of a desired image thereon.

According to the liquid jet recording head according to the present invention completed in the above-described manner, the protective coating to cover at least the heat generating portion is made up of a plurality of layers which complement one another the characteristics required of the protective coating at a place where it is provided, and the plurality of layers are laminated with high adhesive strength one another. As the result of this, there is no possibility of troubles such as peeling-off of the laminated layers constituting the multi-layered protective coating, and so forth to take place in frequent repetitive use of the recording head or continued use of it over a long period of time, whereby favorable liquid droplets forming characteristic as at the initial stage of the recording operation can be maintained stably over a long period of time. In addition, the liquid jet recording head of the present invention does not at all bring about peeling-off among the adjacent layers forming the protective coating, and, even when the recording head is rendered a multi-orifice type, the adjacent layers of the protective coating exhibit good adhesiveness, high reliability, and high manufacturing yield.

With a view to enabling those persons skilled in the art to reduce the present invention into practice, the following examples are provided along with comparative examples.

EXAMPLE 1

A silicon wafer was subjected to thermal oxidation to form thereon an $SiO_2$ film of 5 μm thickness, which was made a substrate.

Then, as the resistive heat generating layer, a $HfB_2$ layer of 1,500Å was formed on the surface of the substrate by the sputtering, followed by continuous deposition of a Ti layer of 50 Å and an Al layer of 5,000 Å by the electron beam deposition.

A predetermined pattern was formed by the photolithographic process with a size of the heat acting zone being 30 μm wide, and 150 μm long. The resistance of this heat acting zone was 150 ohms including the resistance of the aluminum electrodes.

Next, $SiO_2$ was laminated over all surface of the substrate to a film thickness of 2.5 μm by the high rate sputtering (formation of the first layer). Subsequently, a tantalum (Ta) layer was deposited on the first layer composed of $SiO_2$ to a film thickness of 600 Å by the sputtering, after which the deposited layer of tantalum (Ta) was perfectly oxidized in air at 500° C., thereby forming $Ta_2O_5$ layer as the second layer.

After the formation of the second layer of $Ta_2O_5$, a tantalum (Ta) layer was deposited on this second layer to a film thickness of 0.9 μm by the sputtering, thereby completing the protective coating consisting of three layers.

On the substrate with the resistive heat generating portion and the protective coating having been thus formed on it, there was laminated a photosensitive resin dry film to a film thickness of 50 μm, followed by a exposure and development of the film through a predetermined pattern masking, thereby providing the liquid flow path and the common liquid chamber in correspondence to the heat generating portion on the substrate. Further, by use of epoxy type adhesive agent, a glass ceiling plate was laminated to complete the liquid jet recording head as shown in FIG. 3.

Using this liquid jet recording head, a recording apparatus was assembled. A rectangular voltage of 30 V was applied to the electro-thermal transducer of the recording head at a frequency of 800 Hz for $\mathbf{10}^9$ times in 10 μs, thereby ejecting ink from the orifice, and evaluating durability of the recording head against its continued use.

The durability against continued use was evaluated by applying repetitive electric pulse for $10^9$ times, and thereafter finding a ratio of the electro-thermal transducer, to which application of electric pulses became impossible due to wire breakage, etc. Table 1 below indicates the results of such evaluation.

Apart from the above, adhesive strength was tested on a protective coating of a three-layered structure as fabricated in this example. The test was conducted by first forming grooves on the surface of the substrate with the first to third layers of the protective coating having been formed thereon. The grooves were formed in a checker board pattern of 1 mm square, with a depth deeper the thickness of the protective coating and a width of approximately 80 μm to an extent that does not sever the substrate, then adhering under pressure an adhesive tape on the surface thereof, after which observations were made through a microscope and naked eyes on the exfoliated state of the protective coating when the tape is peeled off in the substantially horizontal direction to the base plate surface, and the adhesive strength was evaluated in accordance with the following evaluation standards: (o ) . . . no exfoliation at all could be observed; (Δ) . . . exfoliation took place on one surface part of the base plate; and (x ) . . . exfoliation took place almost entire surface of the specimen. The results of evaluation in this example are shown in Table 1 below.

EXAMPLE 2

The second layer of $Ta_2O_5$ in the protective coating on the base plate of the liquid jet recording head in Example 1 above was formed by first depositing a tantalum (Ta) layer to a thickness of 0.6 μm on the first layer of $SiO_2$ through the sputtering method, after which the Ta layer was oxidized in a phosphoric acid bath by use of the anodic oxidation method to convert it to $Ta_2O_5$ layer. After this, using this base plate, the liquid jet recording head was fabricated in the same manner as in Example 1, and its durability against continued use and the adhesive strength of the protective coating were evaluated. The results of the evaluation are as shown in Table 1 below.

EXAMPLE 3

The second layer of $Ta_2O_5$ in the protective coating on the base plate of the liquid jet recording head in Example 1 was formed by use of a sintered target of $Ta_2O_5$ which was deposited on the first layer of $SiO_2$ by sputtering. Using this base plate, the liquid jet recording head was fabricated in the same process as in Example 1 above, followed by evaluation of the durability against continued use of the recording head and the adhesive strength of the protective coating in accordance with the method as described in Example 1 above. The results of the evaluation are as shown in Table 1 below.

Comparative Example 1

Instead of the protective coating in three-layered structure provided on the base plate of the liquid jet recording head fabricated in Example 1 above, there was fabricated a recording head with use of a substrate, on which was formed a protective coating consisting of the first layer of $SiO_2$ and the second layer of Ta, without forming the second layer of $Ta_2O_5$ The durability against continued use of the recording head and the adhesive strength of the protective coating was evaluated in accordance with the method of Example 1 above. The results are shown in Table 1 below.

Comparative Example 2

In place of $Ta_2O_5$ used for the second layer in the protective coating on the substrate of the liquid jet recording head in Example 1 above, titanium (Ti) was vapor-deposited on the substrate to a thickness of 1,000 Å to form the second layer, with which the liquid jet recording head was fabricated. The durability against continued use of the recording head and the adhesive strength of the protective layer were evaluated in accordance with the method of Example 1 above. The results are shown in Table 1 below.

TABLE 1

| | Ratio (%) of Electro-Thermal Transducer, to which Application of Electric Pulses Became Impossible | Adhesive Strength of Protective Coating |
|---|---|---|
| Example 1 | 0.5 | o |
| Example 2 | 0 | o |
| Example 3 | 0.3 | o |
| Comparative Example 1 | 38 | Δ |
| Comparative | 65 | x |

TABLE 1-continued

| | Ratio (%) of Electro-Thermal Transducer, to which Application of Electric Pulses Became Impossible | Adhesive Strength of Protective Coating |
|---|---|---|
| Example 2 | | |

o . . . EXTREMELY GOOD
Δ. . . PRACTICALLY USABLE
x . . . PRACTICALLY UNUSABLE

We claim:

1. A liquid jet recording head comprising:

a liquid discharge section having an orifice for forming flying liquid droplets and a liquid flow path communicatively connected with said orifice and having a heat acting zone wherein heat energy acts on liquid to form the liquid droplets;

an electro-thermal transducer having at least a pair of mutually confronting electrodes electrically connected to a resistive heat generating layer on a substrate to form a heat generating portion between said pair of electrodes; and a protective coating including at least three layers, each comprising an inorganic material, laminated to cover the top surface of at least said heat generating portion, at least two mutually adjacent layers in said protective coating having therein at least one element common to both said layers.

2. The liquid jet recording head according to claim 1, wherein said first layer comprises an oxide, said second layer comprises a metal oxide, and said third layer comprises a metal the same as that in said metal oxide, said layers being provided in the order mentioned from said heat generating portion.

3. The liquid jet recording head according to claim 2, wherein said oxide is silicon oxide, said metal oxide is tantalum oxide, and said metal is tantalum.

4. The liquid jet recording head according to claim 2, wherein said oxide is aluminum oxide, said metal oxide is zirconium oxide, and said metal is zirconium.

5. The liquid jet recording head according to claim 2, wherein said oxide is tantalum oxide, said metal oxide is hafnium oxide, and said metal is hafnium.

6. The liquid jet recording head according to claim 1, wherein said first layer comprises a nitride, said second layer comprises a metal nitride, and said third layer comprises a metal the same as that in said metal nitride, said layers being provided in the order mentioned from said heat generating portion.

7. The liquid jet recording head according to claim 6, wherein said nitride is silicon nitride, a said metal nitride is tantalum nitride, and said metal is tantalum.

8. The liquid jet recording head according to claim 6, wherein said nitride is aluminum nitride, said metal nitride is molybdenum nitride, and said metal is molybdenum.

9. The liquid jet recording head according to claim 1, wherein:

said first layer, second layer and third layer are provided in the order mentioned from said heat generating portion;

said first layer is an inorganic material selected from the group consisting of titanium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide, aluminum oxide, calcium oxide, strontium oxide, barium oxide, silicon oxide, silicon nitride, aluminum nitride, boron nitride, tantalum nitride, amorphous silicon having high electrical resistance, amorphous selenium having high electrical resistance, and a composite material made up of at least two such materials;

said third layer is a metal selected from the group consisting of scandium, yttrium (Y), titanium (Ti), zirconium (Zr), hafnium (Hf), tantalum (Ta), vanadium (V), niobium (Nb), chromium, (Cr), molybdenum (Mo), tungsten (W), iron (Fe), cobalt (Co) and nickel (Ni), an alloy selected from thr group consisting of Ti-Ni, Ta-W, Ta-Mo-Ni, Ni-Cr, Fe-Co, Ti-W, Fe-Ti, Fe-Ni, Fe-Cr and Fe-Ni-Cr, a metal carbide selected from the group consisting of Ti-C, Zr-C, V-C, Ta-C, Mo-C and Ni-C, a metal boride selected from the group consisting of Ti-B, Ta-B, Hf-B and W-B, a metal silicate selected from the group consisting of Mo-Si W-Si, and Ta-Si, and a metal nitride selected from the group consisting of Ti-N, Nb-N and Ta-N; and said second layer contains at least one first element common to the material of said first layer, and at least one second element common to the material of said third layer.

10. The liquid jet recording head according to claim 1, wherein said first, second and third layers are provided in that order from said heat generating portion and said second layer comprises a material that includes at least one element common to the material comprising said first and third layers.

11. The liquid jet recording head according to claim 10, wherein said first and third layers comprise materails different from each other and said second layer comprises a material that includes a first element common to the material comprising said first layer and a second element common to the material comprising said third layer.

* * * * *

UNITED STATES PATENT AND TRADEMARK OFFICE
CERTIFICATE OF CORRECTION

PATENT NO. : 4,596,994

DATED : June 24, 1986

INVENTOR(S) : HIROTO MATSUDA, ET AL.

It is certified that error appears in the above-identified patent and that said Letters Patent is hereby corrected as shown below:

Column 1, line 37, change "it is" to --is it--.

Column 3, line 6, change "thousands" to --thousand--.

Column 6, line 33, add space after "nickel"; and
line 57, change "material" to --materials--.

Column 7, line 25, after "different" insert --from--.

Column 8, line 36, change "According to the" to --In a--;
line 41, after "another" insert --and give--;
line 44, delete "one another"; and
line 47, change "to" to --, which can--.

UNITED STATES PATENT AND TRADEMARK OFFICE
CERTIFICATE OF CORRECTION

PATENT NO. : 4,596,994

DATED : June 24, 1986

INVENTOR(S) : HIROTO MATSUDA, ET AL.

It is certified that error appears in the above-identified patent and that said Letters Patent is hereby corrected as shown below:

Column 9, line 38, change "10" to regular type-face;

line 55, add "than" after "deeper"; and line 68, change "almost" to --on almost the--.

Column 12, line 21, add "(Sc)" after "scandium";

line 26, change "thr" to --the--; and line 33, after "Mo-Si" insert --,-- and change "W-Si," to --W-Si--.

Signed and Sealed this

Sixth Day of January, 1987

*Attest:*

DONALD J. QUIGG

*Attesting Officer*

*Commissioner of Patents and Trademarks*